(12) United States Patent
Carothers

(10) Patent No.: US 7,693,354 B2
(45) Date of Patent: Apr. 6, 2010

(54) SALICIDE STRUCTURES FOR HEAT-INFLUENCED SEMICONDUCTOR APPLICATIONS

(75) Inventor: Daniel N. Carothers, Oro Valley, AZ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/201,791

(22) Filed: Aug. 29, 2008

(65) Prior Publication Data
US 2010/0054653 A1 Mar. 4, 2010

(51) Int. Cl.
G02F 1/01 (2006.01)
G02B 6/12 (2006.01)
(52) U.S. Cl. .............................. 385/1; 385/14
(58) Field of Classification Search ........................ None
See application file for complete search history.

(56) References Cited

U.S. PATENT DOCUMENTS

| | | | |
|---|---|---|---|
| 4,420,258 A | 12/1983 | Burns et al. | |
| 4,547,072 A | 10/1985 | Yoshida et al. | |
| 4,748,617 A | 5/1988 | Drewlo | |
| 4,921,354 A | 5/1990 | SooHoo | |
| 5,165,001 A | 11/1992 | Takagi et al. | |
| 5,281,805 A | 1/1994 | Sauer | |
| 5,371,591 A | 12/1994 | Martin et al. | |
| 5,430,755 A | 7/1995 | Perlmutter | |
| 5,625,636 A | 4/1997 | Bryan et al. | |
| 5,674,778 A | 10/1997 | Lee et al. | |
| 5,703,989 A | 12/1997 | Khan et al. | |
| 5,736,461 A | 4/1998 | Berti et al. | |
| 5,828,476 A | 10/1998 | Bonebright et al. | |
| 5,834,800 A | 11/1998 | Jalali-Farahani et al. | |
| 5,970,370 A | 10/1999 | Besser et al. | |
| 6,117,771 A | 9/2000 | Murphy et al. | |
| 6,242,324 B1 | 6/2001 | Kub et al. | |
| 6,278,168 B1 | 8/2001 | Day | |
| 6,306,722 B1 | 10/2001 | Yang et al. | |
| 6,317,526 B1 | 11/2001 | Shirasaki et al. | |

(Continued)

FOREIGN PATENT DOCUMENTS

EP 0 818 693 1/1998

(Continued)

OTHER PUBLICATIONS

"Electronic-photonic Integrated Circuits on the CMOS Platform", Kimerling, et al., 2006, 10 pages.

(Continued)

*Primary Examiner*—Tina M Wong
(74) *Attorney, Agent, or Firm*—Grossman, Tucker, Perreault & Pfleger, PLLC; Neil F. Maloney

(57) ABSTRACT

A salicide heater structure for use in thermo-optic and other heat-influenced semiconductor devices is disclosed. In one example embodiment, a system is provided that includes a silicon substrate, and a salicide heating element formed on the substrate, for delivering heat radiation to a heat-influenced semiconductor device. Another example embodiment is a salicide semiconductor system that includes a silicon substrate and a salicide structure formed on the substrate, wherein the salicide structure is for delivering heat radiation to a heat-influenced semiconductor device.

20 Claims, 5 Drawing Sheets

U.S. PATENT DOCUMENTS

| | | |
|---|---|---|
| 6,331,445 B1 | 12/2001 | Janz et al. |
| 6,387,720 B1 | 5/2002 | Misheloff et al. |
| 6,400,996 B1 | 6/2002 | Hoffberg et al. |
| 6,477,285 B1 | 11/2002 | Shanley |
| 6,605,809 B1 | 8/2003 | Engels et al. |
| 6,677,655 B2 | 1/2004 | Fitzergald |
| 6,680,495 B2 | 1/2004 | Fitzergald |
| 6,696,354 B2 | 2/2004 | Huang |
| 6,725,119 B1 | 4/2004 | Wake |
| 6,738,546 B2 | 5/2004 | Deliwala |
| 6,759,720 B2 * | 7/2004 | Shinkawata .......... 257/413 |
| 6,762,128 B2 | 7/2004 | Bernkopf et al. |
| 6,785,430 B2 | 8/2004 | Paniccia |
| 6,785,447 B2 | 8/2004 | Yoshimura et al. |
| 6,795,622 B2 | 9/2004 | Forrest et al. |
| 6,850,252 B1 | 2/2005 | Hoffberg |
| 6,861,369 B2 | 3/2005 | Park |
| 6,925,232 B2 | 8/2005 | Laskowski et al. |
| 6,936,839 B2 | 8/2005 | Taylor |
| 6,968,110 B2 | 11/2005 | Patel et al. |
| 7,006,881 B1 | 2/2006 | Hoffberg et al. |
| 7,010,208 B1 | 3/2006 | Gunn, III et al. |
| 7,020,365 B2 | 3/2006 | Sandhu et al. |
| 7,043,106 B2 | 5/2006 | West et al. |
| 7,072,556 B1 | 7/2006 | Gunn, III et al. |
| 7,082,247 B1 | 7/2006 | Gunn, III et al. |
| 7,103,252 B2 | 9/2006 | Ide |
| 7,120,336 B2 | 10/2006 | Sandhu et al. |
| 7,139,448 B2 | 11/2006 | Jain et al. |
| 7,215,838 B2 | 5/2007 | Sandhu et al. |
| 7,215,845 B1 | 5/2007 | Chan et al. |
| 7,218,809 B2 | 5/2007 | Zhou et al. |
| 7,218,826 B1 | 5/2007 | Gunn, III et al. |
| 7,259,031 B1 | 8/2007 | Dickson et al. |
| 7,272,279 B2 | 9/2007 | Ishikawa et al. |
| 7,285,491 B2 | 10/2007 | Chen et al. |
| 7,315,679 B2 | 1/2008 | Hochberg et al. |
| 7,333,679 B2 | 2/2008 | Takahashi |
| 7,346,238 B2 | 3/2008 | Kimerling et al. |
| 7,348,230 B2 | 3/2008 | Matsuo et al. |
| 7,356,221 B2 | 4/2008 | Chu et al. |
| 7,447,395 B2 | 11/2008 | Montgomery et al. |
| 2002/0039830 A1 | 4/2002 | Yeh et al. |
| 2003/0020144 A1 | 1/2003 | Warble et al. |
| 2003/0026546 A1 | 2/2003 | Deliwala |
| 2003/0183825 A1 | 10/2003 | Morse |
| 2004/0146431 A1 | 7/2004 | Scherer et al. |
| 2004/0190274 A1 | 9/2004 | Saito et al. |
| 2005/0094938 A1 | 5/2005 | Ghiron et al. |
| 2005/0101038 A1 * | 5/2005 | Verma et al. .......... 438/20 |
| 2005/0253200 A1 * | 11/2005 | Murthy et al. .......... 257/382 |
| 2006/0158723 A1 | 7/2006 | Voigt et al. |
| 2006/0233504 A1 * | 10/2006 | Hochberg et al. .......... 385/129 |
| 2006/0238866 A1 | 10/2006 | Von Lerber |
| 2006/0240667 A1 | 10/2006 | Matsuda et al. |
| 2007/0116398 A1 | 5/2007 | Pan et al. |
| 2007/0202254 A1 | 8/2007 | Ganguli et al. |
| 2007/0292075 A1 * | 12/2007 | Montgomery et al. .......... 385/14 |
| 2008/0159751 A1 | 7/2008 | Matsui et al. |
| 2008/0240180 A1 | 10/2008 | Matsui et al. |

FOREIGN PATENT DOCUMENTS

| | | |
|---|---|---|
| EP | 1067409 A2 | 1/2001 |
| WO | 9314514 | 7/1993 |
| WO | 0127669 | 4/2001 |
| WO | 0216986 | 2/2002 |
| WO | 2004088724 | 10/2004 |
| WO | 2007149055 | 12/2007 |

OTHER PUBLICATIONS

"An Overview of Photonics Research at Lawrence Livermore National Laboratory", Roeske, et al., 1994, 18 pages.

"Trench Structure Improvement of Thermo-Optic Waveguides", Fang Lin-Chao, 2007, 5 pages.

"Analysis of Temperature Profiles of Thermo-Optic Waveguides", Fang-Lin Chao, et al., Fiber and Integrated Optics, vol. 13, Issue 4 1994, abstract only, 1 pg.

Pruessner et al., "InP-Based Optical Waveguide MEMS Switches with Evanescent Coupling Mechanism", Journal of Microelectromechanical Systems, vol. 14, No. 5, Oct. 2005.

May et al., "Integrated Process for Silicon Nitride Waveguide Fabrication", IBM Technical Disclosure Bulletin, vol. 33, No. 2, Jul. 1990.

Matsushita et al., "Narrow CoSi2 Line Formation on SiO2 by Focused Ion Beam", IEEE Xplore 1999.

"Process Integration", Cobalt Self-aligned Silicide Process, Chapter 13, 2005.

Liu et al., "Design of Monolithically Integrated GeSi Electro-absorption Modulators and Photodetectors on an SOI Plaform", Optics Express 623, vol. 15, No. 2, Jan. 22, 2007.

Fijol et al., "Fabrication of Silicon-on-insulator Adiabatic Tapers for Low Loss Optical Interconnection of Photonic Devices", 2004.

Yap et al., "Integrated Opteoelectronic Circuits with InP-based HBTs", Proceedings of SPIE, vol. 4290, 2001.

Roth, "Electroabsorption Modulators for CMOS Compatible Optical Interconnects in III-V and Group IV Materials", Aug. 2007, (part 1 of 3).

Roth, "Electroabsorption Modulators for CMOS Compatible Optical Interconnects in III-V and Group IV Materials", Aug. 2007, (part 2 of 3).

Roth, "Electroabsorption Modulators for CMOS Compatible Optical Interconnects in III-V and Group IV Materials", Aug. 2007, (part 3 of 3).

Kik et al., "Erbium Doped Optical Waveguide Amplifiers on Silicon", MRS Bulleting 23(4), 48, Apr. 1998.

Okyay et al., "Silicon Germanium CMOS Optoelectronic Switching Device: Bringing Light to Latch", IEEE Transactions on Electron Devices, vol. 54, No. 12, Dec. 2007.

McAulay et al., "All-optical Switching and Logic with an Integrated Optic Microring Resonator", Proc. of SPIE vol. 5814, 2005.

Kimmet, "Chapter 6. Integrated Circuit Fabrication Details", 1999, 18 pages.

Office Action dated Jun. 2, 2009 from related matter U.S. Appl. No. 12/201,943 (11 pages).

International Search Report from related application PCT/US09/55209 mailed Oct. 20, 2009.

PCT Written Opinion from related application PCT/US09/55209 mailed Oct. 20, 2009.

\* cited by examiner

SALICIDE STRUCTURES FOR HEAT-INFLUENCED SEMICONDUCTOR APPLICATIONS

RELATED APPLICATIONS

This application is related to U.S. application Ser. No. 12/201,807, filed Aug. 29, 2008, and titled "Two-Step Hardmask Fabrication Methodology for Silicon Waveguides" which is herein incorporated by reference in its entirety.

FIELD OF THE INVENTION

The invention relates to semiconductors, and more particularly, to salicide structures for use in heat-influenced semiconductor applications, such as in thermo-optic devices.

BACKGROUND OF THE INVENTION

Thermo-optic effect generally represents the change in optical properties of a material due to heat radiation. This phenomenon can be exploited in various beneficial ways. For instance, a common element used in optical waveguide applications is a thermo-optic device.

In such a device, a portion of a waveguide is heated using of a local resistive heating element. The heat generated by the heating element causes the optical signal within the waveguide to phase shift in accordance with the thermo-optic effect. The induced phase shift can be represented by the change of refractive index with change in temperature (i.e., dn/dT). Additional heat induced phase shift may further result from thermal expansion of waveguide. The waveguide output remains at a fixed wavelength if temperature is constant. The resistive heaters are fabricated by the deposition and patterning of metal films (e.g., aluminum, tungsten, nickel, chrome, ni-chrome, gold, or platinum) or semiconductor materials (e.g., polysilicon). Other conventional heater designs include localized Peltier elements.

In operation, a predetermined amount of power is applied to the heater of the thermo-optic device, with that predetermined power being correlated to a desired heater temperature, which is in turn correlated to a desired phase response in the optical waveguide. Numerous techniques are available for applying the desired amount of power, ranging from simple switching circuits that deliver pre-calibrated power levels to more complex feedback circuits that adjust power delivered to the heater element in real-time as the local temperature and/or waveguide output wavelength are monitored. Sensors (e.g., temp, wavelength, etc) are typically used in such feedback systems In any case, conventional thermo-optic heaters are associated with a number of problems. For instance, large metal film and polysilicon heaters are required to be a non-trivial distance from the waveguide, in that such heaters generally have a large thermal profile and very high power consumption. Positioning the heaters too close to the waveguide impedes the effective index variation. In addition, fabricating such conventional heater elements requires additional semiconductor process steps (e.g., deposition, masking, etching, etc). Moreover, these added steps increase the opportunity for manufacturing loss and lower yields.

What is needed, therefore, are new thermo-optic heater designs. In a more general sense, there is a need for devices that can be used to maintain a desired temperature at a semiconductor device.

SUMMARY OF THE INVENTION

One embodiment of the present invention provides a heater system for use with heat-influenced semiconductor devices. The system includes a silicon substrate, and a salicide heating element formed on the substrate, for delivering heat radiation to a heat-influenced semiconductor device proximate the salicide heating element. The system may further include contact pad portions conductively coupled to the salicide heating element, for applying power to the salicide heating element. The contact pad portions can further be conductively coupled to metal contacts (e.g., so as to be accessible for applying power to those metal contacts). The system may include the heat-influenced semiconductor device. In one such case, the salicide heating element is buried in a silicon dioxide cladding layer and is not in physical contact with the heat-influenced semiconductor device. In another such case, the system is a thermo-optic system and the heat-influenced semiconductor device is an optical waveguide. Alternatively, the heat-influenced semiconductor device can be, for example, an active device such as a transistor or other temperature-sensitive semiconductor device. There may be a plurality of salicide heating elements formed on the substrate, for delivering the heat radiation. The silicon substrate can be, for example, single crystal, polycrystalline, or amorphous silicon on an isolating layer of dielectric. In one example case, the silicon substrate is a standard wafer or a silicon-on-insulator (SOI) substrate.

Another embodiment of the present invention provides a method of making a heater system for use with heat-influenced semiconductor devices. The method includes providing a silicon substrate, and forming one or more salicide heating elements on the substrate, for delivering heat radiation to a heat-influenced semiconductor device proximate the one or more salicide heating elements. In one such embodiment, forming one or more salicide heating elements on the substrate includes depositing metal on the substrate for heating element portions and contact pad portions, and heating the substrate to react the substrate with the metal to form a salicide heater. In this particular case, the method may further include etching away excess metal, and may further include repeating the heating step at a higher temperature after the etching step. The method may further include depositing metal contacts that are conductively coupled to the contact pad portions. The method may include forming the heat-influenced semiconductor device on the substrate. In one such case, the heat-influenced semiconductor device is, for example, a waveguide or active device. In another such case, forming the heat-influenced semiconductor device and forming the one or more salicide heating elements are performed, at least in part, contemporaneously.

Another embodiment of the present invention provides a salicide semiconductor system. The system includes a silicon substrate. The system further includes a salicide structure formed on the substrate, for delivering heat radiation to a heat-influenced semiconductor device. In one such case, the salicide structure is buried in a silicon dioxide cladding layer and is not in physical contact with the heat-influenced semiconductor device. In another such case, there is a plurality of salicide structures formed on the substrate, for delivering the heat radiation to the heat-influenced semiconductor device.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

A salicide methodology and structures are disclosed. The salicide structure can be used, for example, as a heater configured to provide stable optical phase control within a silicon waveguide (in thermo-optic applications), or to maintain a desired temperature at any number of heat-influenced semiconductor components (e.g., transistors or other temperature-sensitive devices). The heaters can be integrated in close lateral proximity to the temperature-sensitive component. Relative to conventional heating elements, the salicide heaters have a small thermal cross-section and low power consumption, and can be fabricated in a more efficient process.

Thermo-Optic and Other Heat-Influenced Devices

Figure 1:
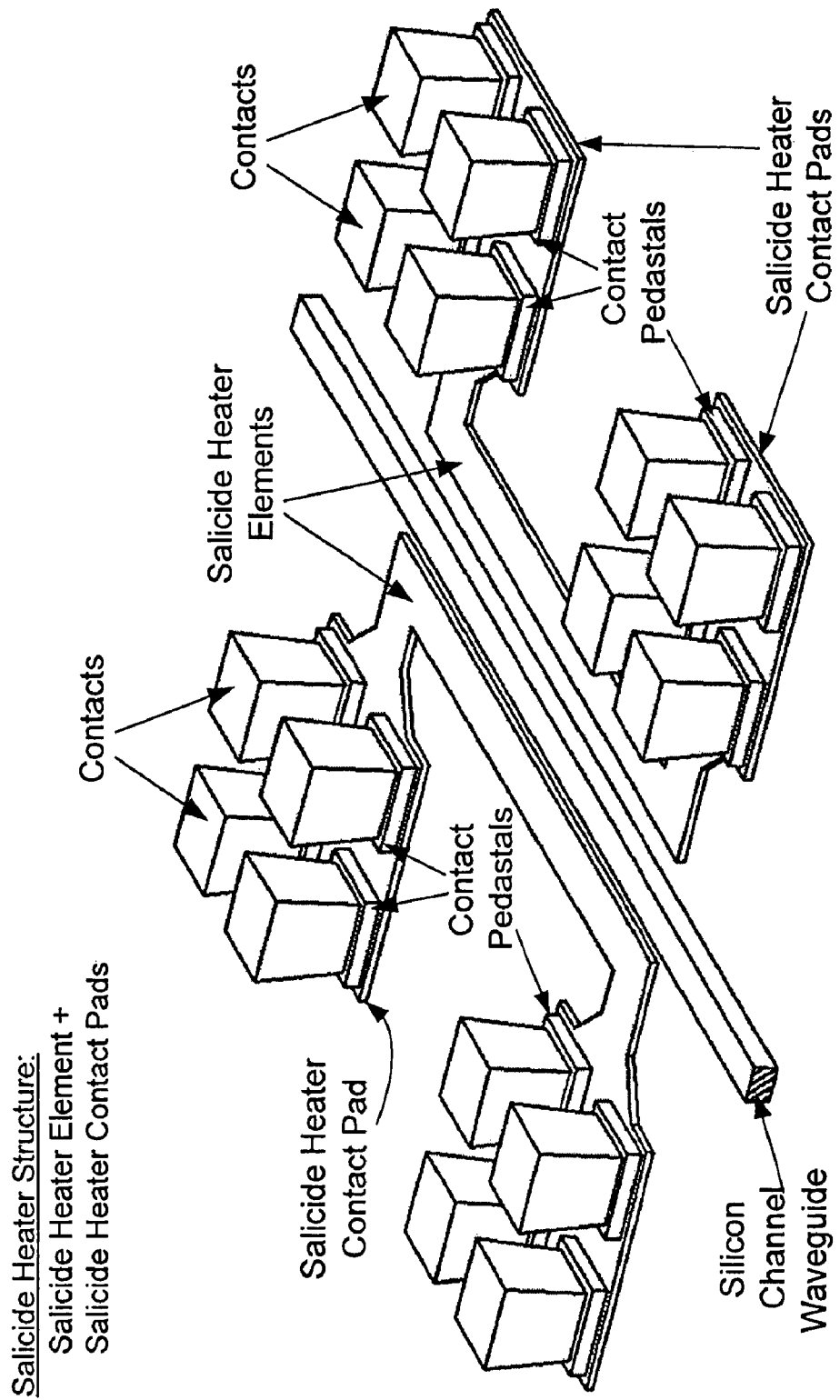
FIG. 1 is a perspective view of an optical waveguide circuit configured with a salicide heater, in accordance with an embodiment of the present invention.
Figure 2:
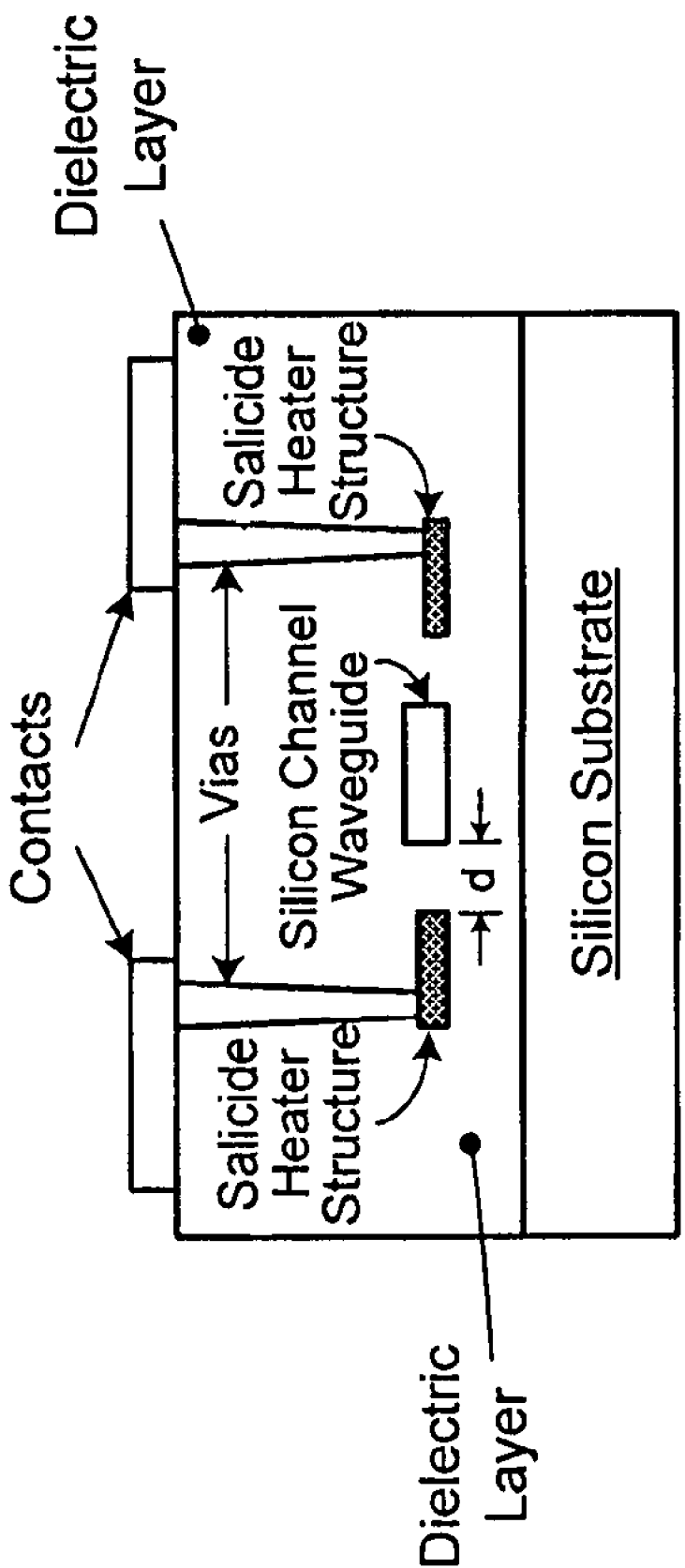
FIG. 2 is a side view of an optical waveguide circuit configured with a salicide heater, in accordance with an embodiment of the present invention.
Figure 3:
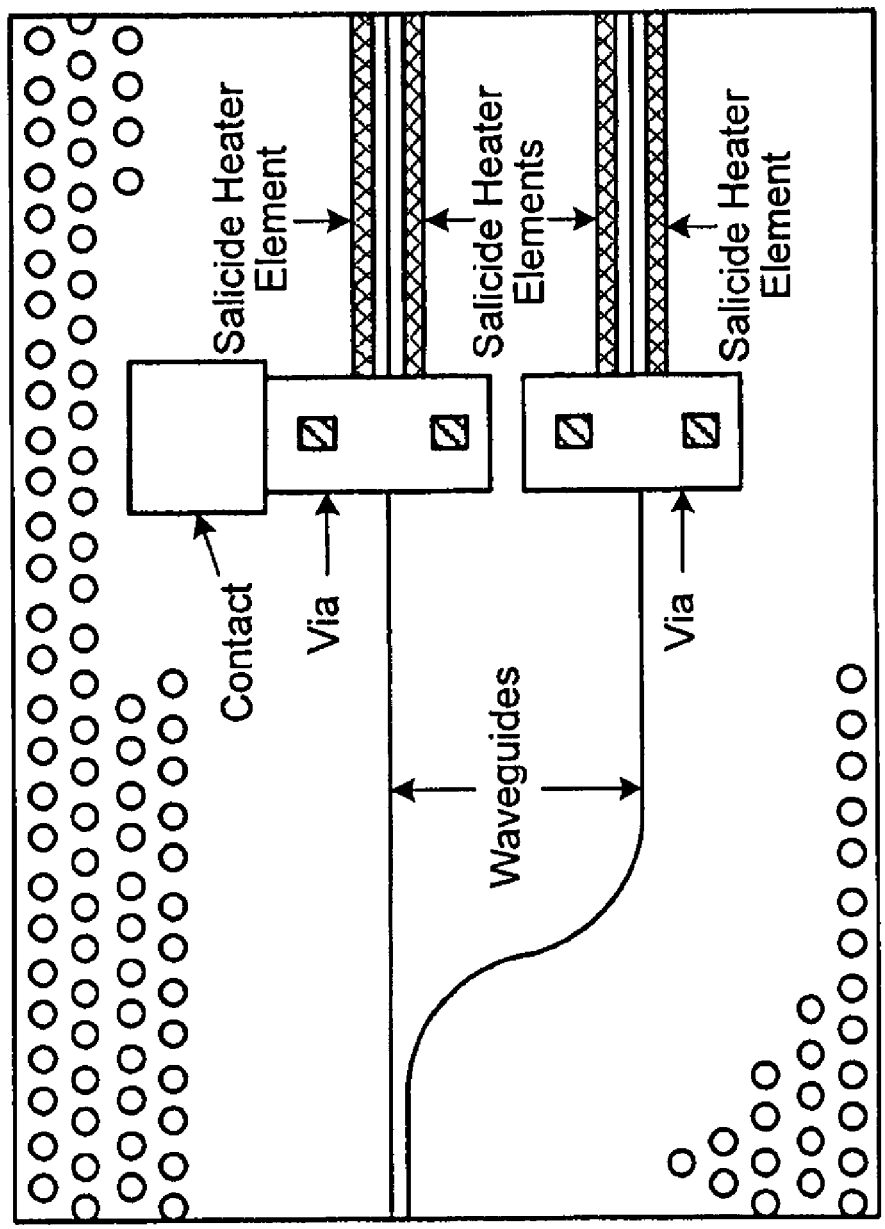
FIG. 3 is a photo of an optical waveguide circuit configured with a salicide heater, in accordance with an embodiment of the present invention.

FIG. 1 is a perspective view of an optical waveguide circuit configured with a salicide heater, in accordance with an embodiment of the present invention. As can be seen, the thermo-optic circuit includes a silicon channel waveguide and a salicide heater structure on each side of the silicon channel waveguide. Each salicide heater structure includes an elongated narrow portion (designated salicide heater element) that runs along side the channel waveguide, as well as two wider pad portions (designated salicide heater contact pad) at each end of the heating element and upon which are formed a number of contact pedestals and corresponding metal contacts. In some embodiments, vias can be used to couple the contact metal to each salicide heater structure (such as shown in FIGS. 2 and 3).

As is known, a silicon channel waveguide is a three dimensional silicon waveguide formed and buried in a dielectric media on a silicon substrate. The waveguide has a core that is surrounded by a cladding, where the cladding material typically has a refractive index much lower than that of the core material. This arrangement, sometimes referred to as a silicon high index contrast (Si-HIC) waveguide, operates to confine light in a target wavelength range within the waveguide structure, thereby allowing the light to propagate transversely along the core (or channel). The peak optical intensity resides in the core. A channel waveguide is particularly well-suited for allowing higher selective confinement of a TE or TM modes.

As is further known, a channel waveguide can be fabricated using a conventional step-by-step semiconductor processing, including deposition of lower clad layer, deposition of core layer, core etch, deposition of upper clad layer, deposition of metal layer, and metal etch. In more detail, a lower clad layer is deposited on the silicon substrate, followed by deposition of a core layer ($n_{clad}$ is lower than $n_{core}$, where n is the index of refraction). A channel waveguide pattern is then applied to the core layer using standard photolithography techniques and the channel is formed (e.g., using ultraviolet masking and reactive ion etching). During the formation process, material around the channel waveguide structure is removed thereby effectively leaving walls extending from the substrate. The structure is then covered by an upper clad layer, typically having the same index of refraction as the lower clad layer. In another example embodiment, the channel waveguide is fabricated as described in the previously incorporated U.S. application Ser. No. 12/201,807. Note, however, that other embodiments may be used with waveguides (or other heat-influenced circuitry) formed by any number of suitable methods.

The term salicide is short for self-aligned silicide, and refers to a semiconductor process for forming electrical contacts between active regions of a semiconductor device and its interconnect structure (e.g., source, drain, gate pins or pads of a transistor), typically using MOS and CMOS technologies. In general, a conventional salicide process for forming the contacts of such devices involves the heat-induced reaction in the active regions of the semiconductor device of a thin metal film that is in direct contact with an underlying silicon substrate of the device. In more detail, a typical salicide process begins with deposition of a thin transition metal layer over a fully formed and patterned semiconductor device on a substrate. Example transition metals suitable for use in salicide processes include cobalt, tungsten, nickel, titanium, and platinum. The substrate upon which the semiconductor device is formed and the thin metal film is deposited is then heated, causing the thin film of transition metal to react with the underlying silicon in the active regions of the device (e.g., source, drain, gate of transistor), thereby forming a low-resistance transition metal silicide. The temperature can vary, but is generally set to ensure proper annealing without being so high as to damage the formed semiconductor device. Following this annealing process, any excess or unreacted transition metal can be removed (e.g., conventional etching process), thereby leaving salicide contacts in the active regions of the device. The resulting contacts are essentially a compound of the metal and substrate (e.g., $CoSi_2$, $TiSi_2$, etc).

In accordance with embodiments of the present invention, a salicide process is used to form salicide heating elements. The salicide heaters allow for greater control over resistivity and uniformity, such that the heaters can operate at CMOS voltage levels (e.g., 0-3.3 volts). In addition, the salicide heaters allow larger temperature fluctuations. As can be seen in this example embodiment, the salicide heaters do not require shared physical modifications to the waveguide. Nor do the salicide heaters employ any ion implantation. Rather, the heaters are free-standing salicide structures, which can be formed using a combination of CMOS and photonic processing steps. In this sense, the salicide heater structure is distinct from the waveguide structure (i.e., the heater is not embedded in the cladding or core materials making up the waveguide, or otherwise in physical contact with the waveguide). The free-standing salicide heaters allow the index of refraction variation to be preserved (i.e., uniformity of the refractive index for the cladding all the way around the waveguide).

In accordance with one particular embodiment, the salicide heaters are formed using cobalt as the transitional thin film metal, thereby providing cobalt salicide ($CoSi_2$) structures that are the result of a combination of CMOS and photonic processing steps. The salicide heaters allow efficient coupling of thermal energy by allowing closer placement of the heaters to waveguide, thereby keeping the waveguide below the modal field. This also enables lower power operation and higher speed operation, as the salicide heaters do not require as great a thermal load to dissipate into bulk dielectric. The heater thickness can vary as needed, depending on factors such as power and duration and/or frequency of heating cycles, but in one particular embodiment ranges from about 80 Angstroms to 1000 Angstroms. Note, however, with the techniques described herein, any suitable thicknesses can be used up to the full thickness of the waveguide. The elongated portions of the salicide heaters running proximate the waveguide can be, for instance, within 0.5 microns of the waveguide channel, without impeding the effective index variation. In contrast, note that conventional thermo-optic heater designs are typically required to be positioned at least 3.0 microns from the waveguide structure, due to their larger thermal profile. In addition, conventional thermo-optic heater designs generally include a relatively thick structure and are formed within the waveguide structure having bulk properties.

As previously explained, some embodiments of the present invention may be used with waveguides formed by any number of suitable methods. Alternatively, other embodiments may be used with other heat-influenced semiconductor components. In this sense, the present invention is not intended to be limited to thermo-optic applications. For example, the salicide heater structures described herein may be used to thermally trim transistors, by maintaining the same temperature at all critical transistors in a given circuit or part of a circuit. In such embodiments, note that the salicide heating structure in accordance with embodiments of the present invention is distinct from any conventional salicide electrical contacts formed as typically done between active regions of a semiconductor device and its interconnect structure.

The metal contacts allow power to be applied to the salicide structure, which in turn generates heat for inducing the desired thermo-optic effect. In the application depicted in FIG. 1, radiation traveling in the waveguide is phase shifted by the localized heat from the salicide heater structures, and in accordance with the thermo-optic effect. As previously explained, numerous schemes can be used to apply power to the heater structures to obtain the desired waveguide phase response (e.g., ranging from simple heater power switching schemes to feedback with sensing and monitoring schemes that use real-time adjustments to the applied heater power to get the desired phase response out of the waveguide). The present invention is not intended to be limited to any such power schemes.

Note that the salicide structure may be shaped differently to suit the given application, as opposed to having the elongated heater elements and heater contact pads at each end of the heating element, as shown in FIG. 1. For instance, the salicide structure may be shaped as a square or rectangular block or land or other suitable shape that runs proximate a heat-influence device. Biasing contact pads can be operatively coupled to the structure, so as to allow for a heater power source to be applied as needed. Alternatively, the heating element may include a number of elongated and/or short runs that meander in various directions proximate a similarly meandering waveguide structure. In short, the salicide structure can be shaped to suit a specific application.

In the particular example of FIG. 1, there are four contact pedestals and corresponding contacts per pad portion. The contact pedestals provide an increased thickness to the pad portion of the heater, so contact vias can be coupled thereto without damaging the pad portion. Another embodiment may simply have, for example, one contact on each contact pad portion, and/or a thicker heater contact pad portion that does not require contact pedestals. In short, any number of contact configurations can be used, so long as long as power can be delivered to each heater element. Example metals suitable for use in forming the contacts include gold, cobalt, tungsten, nickel, titanium, and platinum. The contact metal may be the same as the metal used to make the salicide heater structure, but it need not be the same. In one particular embodiment, the heater structures are made with cobalt and the contacts (and vias) are made with tungsten.

FIG. 2 is a side view of an optical waveguide circuit configured with a salicide heater structure, in accordance with an embodiment of the present invention. As can be seen, the example thermo-optic circuit includes a silicon substrate having formed thereon a silicon channel waveguide and salicide heater structures disposed on each side of the silicon channel waveguide. The dielectric layer can be, for example, a silicon dioxide cladding (or other suitable cladding material) that is deposited during fabrication. Alternatively, and in the case of an silicon-on-insulator (SOI) structure, the dielectric layer represents, for example, the initial 3 um to 5 um buried silicon dioxide of the original SOI structure.

In accordance with one example embodiment, during the manufacturing process and after the salicide conversion, the heater structures are re-coated with a dielectric cladding layer (e.g., silicon dioxide or silicon nitride). The vias are then formed to make contact to the heater structures, and the contact metal is then added after the vias. Thus, each salicide heater structure can be conductively coupled to upper layer contacts with vias. The previous discussion with respect to materials and heater power delivery is equally applicable here. The vias can be made, for example, with the same metal as the contacts and/or the salicide heater structures. In one specific embodiment, the vias and contacts are made with tungsten and the heater structures are made with cobalt. The substrate can be, for example, a standard wafer or a SOI wafer. In one such specific case, the substrate includes a layer of single crystal, polycrystalline, or amorphous silicon on an isolating layer of dielectric, such as silicon dioxide or silicon nitride.

As previously explained with reference to FIG. 1, and in accordance with one example embodiment, the distance (denoted by d in FIG. 2) between elongated heating element portions of the salicide heater structures and the waveguide can be within 0.5 microns of the waveguide channel, without impeding the effective index variation. In addition, the free-standing salicide heater structures allow remote thermal control in an efficient manner as there is no contact with the waveguide; nor is there any contact with the handle wafer, assuming an SOI structure.

FIG. 3 is a photo of an optical waveguide circuit configured with a salicide heater structure, in accordance with an embodiment of the present invention. In more detail, FIG. 3 is a top down picture looking at a heater after the metal contacts are formed. Note the lateral placement of the salicide heater elements proximate the waveguides. The contact and vias are shown as well. The dots in the top and bottom of the picture of this example embodiment are chemical mechanical polishing (CMP) fill shapes, which are essentially blocks of material placed to provide a more uniform material volume for polishing to reduce dishing or other planarity variations.

Manufacturing Methodologies

Figure 4A:
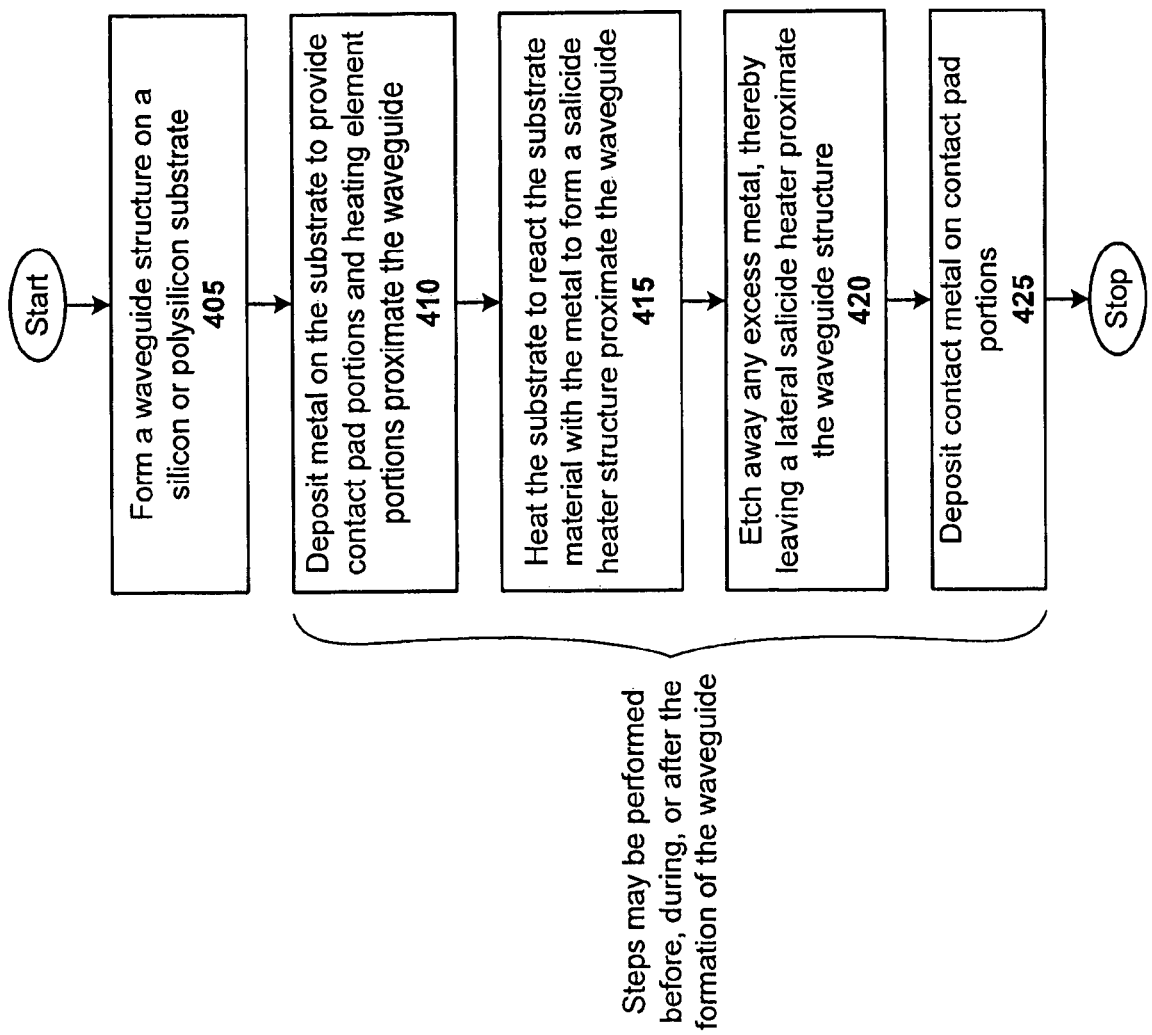
FIGS. 4a and 4b each illustrate a method of making a thermo-optic device configured with a salicide heater, in accordance with an embodiment of the present invention.

FIG. 4a illustrates a method of making a thermo-optic device configured with a salicide heater, in accordance with an embodiment of the present invention. Recall, however, the present invention is not intended to be limited to thermo-optic applications, and may alternatively be used with other heat-influenced semiconductor devices (e.g., transistors).

As previously explained, conventional thermo-optic heater approaches require deposition and modification of waveguide material to form the heater. The approach shown in FIG. 4a uses a CMOS process flow, for developing heaters before, during, or after the fabrication of the waveguide structures. The new flow reduces process complexity and decreases the number of mask steps, compared to conventional heater manufacturing schemes. As will be appreciated, not all manufacturing steps are shown, so as to allow for focused discussion on principles of one embodiment of the present invention. Other manufacturing steps will be apparent in light of this disclosure.

The method includes forming 405 a waveguide structure on a silicon substrate. The silicon substrate may be, for example, single crystal, polycrystalline, or amorphous silicon on an isolating layer of dielectric, such as silicon dioxide or silicon nitride. Note that this forming process may include any number of steps and sub-processes required to create the desired waveguide structure. In addition, other steps of the method may be performed contemporaneously with the waveguide forming steps, to provide desired efficiency. For instance, etching steps can be carried out to create the waveguide structure form as well as the heater form (where the heater metal will be deposited). The overall structure (including the waveguide and heater form) can then be clad with oxide or other suitable dielectric. Additional etching can then be carried out to expose the underlying heater form.

The method further includes depositing 410 metal on the substrate (on to the exposed heater form) to provide contact pad portions and heating element portions proximate the waveguide. FIG. 1 shows example elongated runs proximate the waveguide (heating element portions) and contact areas (contact pad portions) with metal contacts formed thereon. In one particular embodiment, the deposited metal is cobalt. However, any number of metals suitable for a salicide process can be used as previously explained, including aluminum, chrome, cobalt, gold, nickel, platinum, titanium, tungsten, or combinations thereof.

The method further includes heating 415 the substrate to react the substrate material with the metal to form a salicide heater structure proximate the waveguide, and then etching 420 away any excess or unreacted metal, thereby leaving one or more salicide heaters proximate the waveguide structure. The temperature of the heating (annealing) process can be, for example, in the range of 600° C. to 900° C. In one specific example embodiment, the heating 415 step is carried out in two different processing steps, with an etching step executed in between the two annealing steps and then after. In more detail, and assuming the heater metal is cobalt, the first annealing process can be carried out at 600° C. to 800° C. (about 680° C.) using a rapid thermal anneal processing system for about one minute (e.g., 20 to 80 seconds), while the second annealing process can then be can be carried out at 800° C. to 900° C. (about 850° C.) using the rapid thermal anneal processing system for about one minute (e.g., 20 to 80 seconds). Each of these annealing process steps can be carried out in an inert environment (e.g., nitrogen or argon) and/or in a vacuum to reduce contamination, oxidation, and other such undesirable results, depending on materials used and demands of application. After the first annealing process forms CoSi (initial salicide conversion), the substrate is subjected to a selective etch to remove any unwanted materials (including any unreacted cobalt). The CoSi remains intact. Etching can be carried out, for example, using a phosphoric acid/hydrogen peroxide bath at a temperature in the range of 20° C. to 120° C. until desired degree of etch is achieved (e.g., about 5 minutes to 100 minutes, depending on how much material is to be removed). The second annealing process then converts the CoSi to $CoSi_2$ (complete salicide conversion). A subsequent etch can then be performed to remove any remaining unwanted/unreacted material.

The method further includes depositing 425 contacts on the contact pad portions. As previously explained, the contact metal may be the same as the heater metal and/or via metal used to couple the contacts to the contact pad portions. As will be apparent in light of this disclosure, additional steps may be taken prior to depositing 425 the contacts. For example and in accordance with one embodiment, after the salicide conversion and etching steps (steps 415 and 420), the salicide heater structure is re-coated with silicon dioxide (or other suitable dielectric material). Tungsten vias (or other suitable metal) are then formed to make contact to the contact pad portions of the heater structure. The contact metal is deposited after the vias (in accordance with step 425).

Figure 4B:
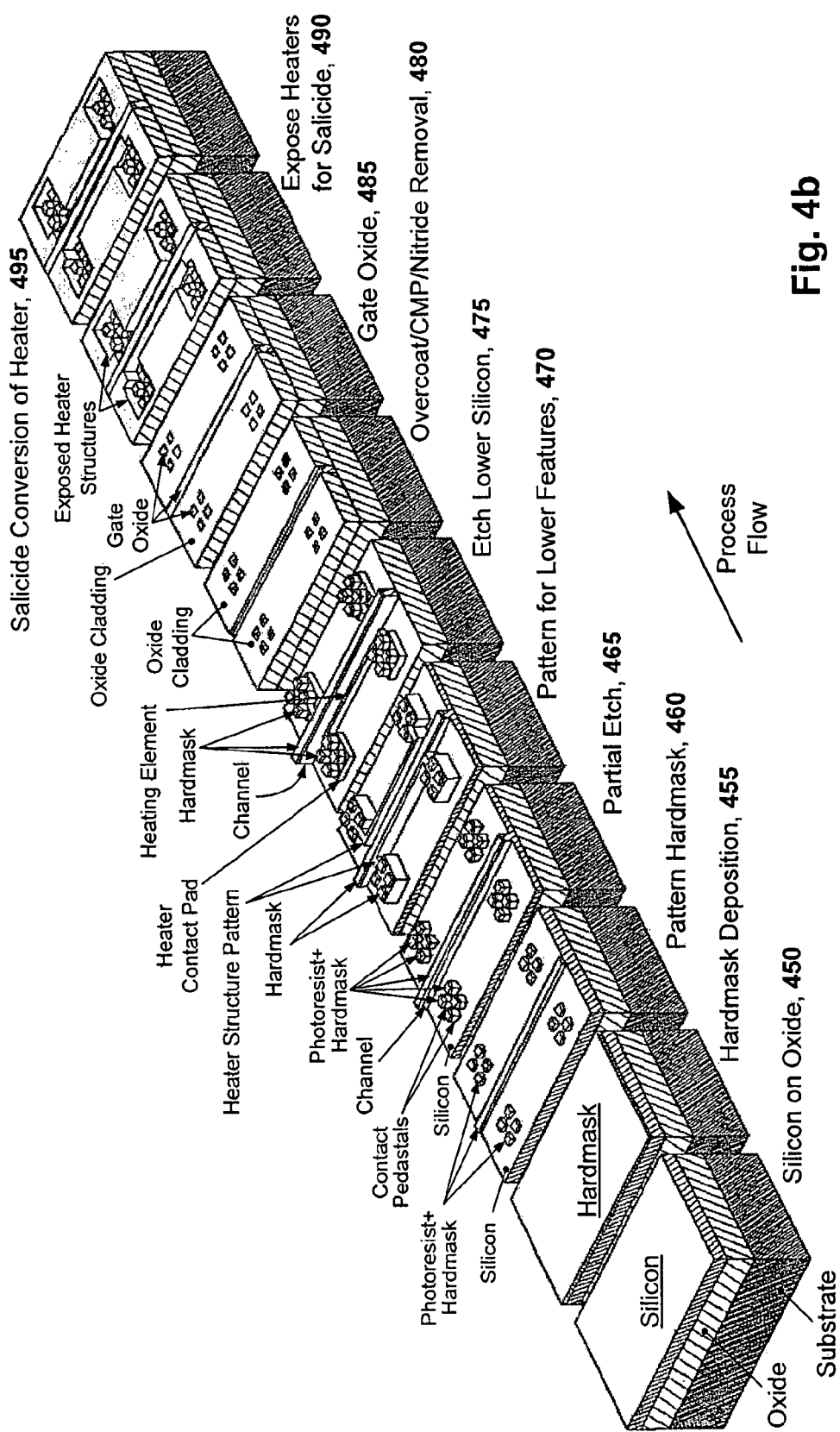

FIG. 4b illustrates a method of making a thermo-optic device configured with a salicide heater, in accordance with another embodiment of the present invention. This process can be used, for instance, to form a channel and/or ridge waveguide along with the salicide heater structures. Additional details of one such process are discussed in the previously incorporated U.S. application Ser. No. 12/201,807. Recall, however, the present invention is not intended to be limited to thermo-optic applications, and may alternatively be used with other heat-influenced semiconductor devices. As can be seen, the process flow includes steps 450 through 495, each of which will be discussed in turn, along with various corresponding features.

In this example embodiment, the process begins at 450 with an SOI wafer having a thick buried oxide (e.g., silicon-on-oxide, as shown in this example, or other suitable insulating material layer), or a grown film of amorphous-silicon, polysilicon or nanosilicon. In general, growing on the flattest possible surface, with the highest quality underlying oxide, is beneficial. In some embodiments, a high density plasma, chemical vapor deposited (HDP-CVD) silicon dioxide is employed for this purpose. The HDP-CVD approach provides a high degree of control over the uniformity of the oxide cladding. The underlying substrate can be, for example, silicon, although other suitable substrate materials can be used, such as gallium arsenide, indium phosphate, and quartz, sapphire, depending on the materials being deposited and giving consideration to factors such as thermal coefficients of expansion. Note that the silicon, oxide, and insulator layers are not labeled in every step in the example process flow shown, but remain constant through the entire process flow unless otherwise indicated (e.g., the silicon layer is etched or otherwise removed at times).

The method continues at 455 with hardmask deposition, which one example case involves the deposition of a oxide/nitride hardmask, wherein a bottom layer of oxide is deposited followed by a top layer of nitride. Each of these two hardmask layers ranges, for example, from about 50 Angstroms to 1200 Angstroms. The two-layer hardmask allows integration within a CMP based process. In more detail, and in accordance with one particular embodiment, a top nitride layer acts as the hardmask and polish stop layer for CMP. The bottom oxide layer acts as a stop for a subsequent removal of the top nitride layer, thereby preserving circuit (e.g., waveguide) qualities not only across the wafer, but from wafer to wafer. Thus, the hardmask etch approach as described herein provides a number of benefits. For instance, it allows the circuit integrity, such as a waveguide, to be controlled and maintained across multiple etches (i.e., the hardmask acts as a constant pattern for multiple etch steps). In addition, the hardmask process effectively controls the lateral profile of the circuit by controlling the way the effluent etch products develop, and also provides a means of using CMP technologies to planarize the wafer without modifying the shape of the waveguide (or other circuit). The evolution of the etch by-product gasses is controlled by moving organic resists farther away, allowing control of the development of various gas chemistries involving oxygen and hydrogen that evolve as the photoresist is consumed. The nitride layer of the hardmask is resistant to the CMP action, and can be selectively removed, with respect to oxide, using a wet etch (e.g., phosphoric acid based etch that is selective to the bottom hardmask layer of oxide). Removing the nitride allows for recovery of the formed circuit (e.g., waveguide), and continuation with CMOS based fabrication processes.

The process continues at 460 with patterning the hardmask. The patterned hardmask features shown in the example embodiment of FIG. 4b form a waveguide channel as well as contact pedestals (also shown in FIG. 1) that are used to provide good electrical contact, by keeping all of the subsequent etches to the same depth. Standard photoresist and etch techniques can be used to pattern the hardmask (e.g., the hardmask not covered by photoresist can be etched away). Note in this example embodiment, the photoresist forming the pattern is left on top of the hardmask (even after the hardmask is etched) for subsequent processing. Further note that, in some cases, if the pedestals are not used, the contact vias can be etched to two different depths; however, vias at the shallowest etch level may get over etched, or the lower via holes may not get etched enough (if trying to preserve the shallower vias). Thus, consideration of such factors can be used in determining whether to employ the contact pedestals.

The method continues at 465 with the first part of a two-step etch process (not counting the initial etch used in patterning the hardmask). In more detail, the first etch etches partway down the silicon layer (of the SOI) with the patterned hardmask and the initial photoresist in place. This partial etch of the silicon layer at 465 may be a continuation of the initial etch used to pattern the hardmask at 460, or may be a separate etch process depending on factors such as the hardmask material employed. In general, any etch process suitable to remove the targeted portions of exposed hardmask and silicon can be used. In one specific embodiment, the first etch allows the hardmask to be etched, and then the silicon, in the same tool, without exposing the wafer to air. This first etch is to a predetermined depth, sufficient for optical transport or electrical contact.

After the first etch, the wafer can be removed from the tool and the initial photoresist used to pattern the hardmask is removed. The hardmask itself, however, is left on to preserve the waveguide (or other circuitry) shape and uniformity for the following second etch. The method continues at 470 with patterning the lower features. In this example embodiment shown in FIG. 4b, the patterned lower features form salicide heater structures (also shown in FIG. 1) that are used to provide heat to the waveguide structure for thermo-optic effect. There are two heater structures included in this example embodiment, each having an elongated heating element portion with two heater contact pads at each end. Standard photoresist and photolithographic techniques can be used to pattern the heaters (e.g., heater mask not covered by photoresist can be removed using phosphoric acid or other suitable etchant). Note that hardmask of oxide/nitride remains in place on the channel and contact pedestals.

Once the lower features are patterned, the second etch of the two-step etch process can be carried out. In the example, the second etch at 475 defines the shape, or forms of the heater structures. In more detail, and with reference to 475 of the example case of the salicide heaters shown in FIG. 4b, a heating element is defined that is separated from the waveguide, yet physically close in terms of offset. This heating element feature (or slab) along with its corresponding contact pads at each end, are then salicided in a later step to form the heater structure.

After the second waveguide etch, the wafer can be prepped for subsequent processing, and in one example case, is put through an RCA clean. The method then continues at 480, where a thick oxide overcoat or cladding is deposited. In one such embodiment, the oxide coat is provided using an HDP-CVD silicon dioxide method, which provides uniformity of the cladding index. Step 480 further includes a CMP polishing process to planarize the deposited oxide surface. This planarization provides a planer surface suitable for the formation of items such as CMOS field effect transistors (FETs), and for the fabrication of the high performance metal interconnects. In the fabrication of CMOS FETS, for instance, such a planarizing process is commonly used after shallow trench isolation fill. The planarization/polish portion of step 480 stops on or partially removes the top nitride layer of the hardmask. The nitride hardmask (or remainder thereof) can then be removed, for example, with a wet etch (e.g., using phosphoric acid). Note that the bottom hardmask layer can be removed, for example, with hydrofluoric acid. The method continues at 485 with deposition of the gate oxide (over the contacts and waveguide channel).

The method continues at 490 with exposing the heater, so the salicide process can be carried out. Standard photoresist and etch techniques can be used to carry out this step (e.g., the oxide not covered by photoresist can be etched away). At 495, the salicide process is carried out, for example, as previously described with reference to steps 415 and 420 of FIG. 4a. In a more general sense, a typical CMOS FET fabrication salicide process (used to form gates and contacts of transistors) can be used, followed by additional silicon oxide deposition, or additional oxide deposition to clad the circuit (in this example case, the waveguide structure). Once the salicide heaters are formed, standard CMOS flow may be used up to last metal contact layer applied.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The invention claimed is:

1. A heater system for use with heat-influenced semiconductor devices, the system comprising:
   a silicon substrate; and
   a salicide heating element formed on the substrate, for delivering heat radiation to a heat-influenced semiconductor device proximate the salicide heating element, wherein the salicide heating element is free standing from the heat-influenced semiconductor device and is thermally separated from the heat-influenced semiconductor device by a dielectric layer.

2. The system of claim 1, further comprising:
contact pad portions conductively coupled to the salicide heating element, for applying power to the salicide heating element.

3. The system of claim 2 wherein the contact pad portions are conductively coupled to metal contacts.

4. The system of claim 1, further comprising the heat-influenced semiconductor device.

5. The system of claim 4 wherein the salicide heating element is buried in a dielectric cladding layer and is not in direct physical contact with the heat-influenced semiconductor device.

6. The system of claim 4 wherein the system is a thermo-optic system and the heat-influenced semiconductor device is an optical waveguide.

7. The system of claim 4 wherein the heat-influenced semiconductor device is an active device.

8. The system of claim 1 wherein there is a plurality of salicide heating elements formed on the substrate, for delivering the heat radiation.

9. The system of claim 1 wherein the substrate is a silicon-on-insulator (SOI) substrate.

10. A method of making a heater system for use with heat-influenced semiconductor devices, the method comprising:
providing a silicon substrate; and
forming one or more salicide heating elements on the substrate, for delivering heat radiation to a heat-influenced semiconductor device proximate the one or more salicide heating elements, wherein the salicide heating element is free standing from the heat-influenced semiconductor device and is thermally separated from the heat-influenced semiconductor device by a dielectric layer.

11. The method of claim 10 wherein forming one or more salicide heating element on the substrate comprises:
depositing metal on the substrate for heating element portions and contact pad portions; and
heating the substrate to react the substrate with the metal to form a salicide heater.

12. The method of claim 11 further comprising etching away excess metal.

13. The method of claim 12 further comprising repeating the heating step at a higher temperature after the etching step.

14. The method of claim 11 further comprising depositing metal contacts that are conductively coupled to the contact pad portions.

15. The method of claim 10, further comprising forming the heat-influenced semiconductor device on the substrate.

16. The method of claim 15 wherein the heat-influenced semiconductor device is a waveguide or active device.

17. The method of claim 15 wherein forming the heat-influenced semiconductor device and forming the one or more salicide heating elements are performed, at least in part, contemporaneously.

18. A salicide semiconductor system, comprising:
a silicon substrate; and
a salicide structure formed on the substrate, for delivering heat radiation to a heat-influenced semiconductor device, wherein the salicide heating element is free standing from the heat-influenced semiconductor device and is thermally separated from the heat-influenced semiconductor device by a dielectric layer.

19. The device of claim 18 wherein the salicide structure is buried in a silicon dioxide cladding layer and is not in direct physical contact with the heat-influenced semiconductor device.

20. The device of claim 18 wherein there is a plurality of salicide structures formed on the substrate, for delivering the heat radiation to the heat-influenced semiconductor device.

* * * * *